United States Patent [19]

Kärnä et al.

[11] Patent Number: 4,966,346
[45] Date of Patent: Oct. 30, 1990

[54] MOUNTING FIXTURE FOR STORAGE BATTERY

[75] Inventors: Toivo Kärnä; Jukka-Pekka Nieminen; Asko Mäisti, all of Porvoo; Hannu Kähönen, Helsinki, all of Finland

[73] Assignee: Neste OY, Finland

[21] Appl. No.: 421,282

[22] Filed: Oct. 13, 1989

[51] Int. Cl.[5] ............................................. H01M 2/10
[52] U.S. Cl. .................................. 248/503; 248/510; 180/68.5; 429/187
[58] Field of Search ............... 248/503, 500, 689, 681, 248/510; 294/903; 224/902; 180/68.5; 429/175, 176, 177, 187, 186

[56] References Cited

U.S. PATENT DOCUMENTS

| | | | |
|---|---|---|---|
| 1,796,343 | 3/1931 | Pierson | 180/68.5 X |
| 2,453,835 | 11/1948 | Donkin | 180/68.5 |
| 2,653,988 | 9/1953 | Rupp | 248/503 X |
| 3,826,115 | 7/1974 | Davis | 180/68.5 X |
| 3,866,704 | 2/1975 | Bowers et al. | 180/68.5 |
| 4,033,424 | 7/1977 | Evans | 180/68.5 |
| 4,684,580 | 8/1987 | Cramer | 429/187 X |
| 4,752,543 | 6/1988 | Anderson et al. | 429/187 X |
| 4,770,957 | 9/1988 | Miyagawa | 429/187 X |

Primary Examiner—David M. Purol
Attorney, Agent, or Firm—Steinberg & Raskin

[57] ABSTRACT

A mounting device secures a storage battery (10) to a base. The device comprises a footing (20–28) to be rigidly fixed to the base (B) and being loose from the battery (10). Locking elements (16–19) of the device are pivotally mounted on the storage battery (10). The storage battery (10) is detachably fastened with the aid of the locking elements to the footing (20–28) through the action rapid locking elements. The locking elements (16–19) are pivotally mounted on a cover (12) of the storage battery (10). Carrying handles (16) are provided for lifting the storage battery (10) from the footing (20–28) when the locking elements (16–19) are turned to the open-position. In addition, shields (17) are provided in the locking element to protect the storage battery terminals (13) when the locking elements (16–19) are turned to locking position.

4 Claims, 2 Drawing Sheets

MOUNTING FIXTURE FOR STORAGE BATTERY

BACKGROUND OF THE INVENTION

The present invention concerns a mounting fixture for a storage battery.

In designs known in the art of storage batteries, for instance automotive engine starting batteries, a battery has been mounted in a space reserved for the battery e.g. in the car engine space, with separate mounting yokes or screw hold-down. When using yoke securement, the yokes have conventionally been pivoted at one end of a fastening base, and at the other end, they have been fixed with screws or equivalent. The yokes usually extend over the storage battery.

In another conventional mounting the storage battery is provided at the bottom with lugs extending across the side walls of the storage battery. The storage battery is secured on the lugs of a fastening base with mounting elements and screws. With this conventional hold-down, there is the essential disadvantage that detaching the storage battery from its fastening base and refastening it is cumbersome, and a separate tool is always needed for this purpose.

SUMMARY OF THE INVENTION

The primary object to the present invention is to provide a mounting device for a storage battery with which device the above drawbacks are avoided. With the mounting device of the present invention, a remarkable improvement is obtained as compared to mounting fixtures known in the art. For implementing this object, the invention provides for a mounting device which comprises a footing part to be fastened rigidly to the base and separate from the storage battery. The mounting device also includes parts pivotally attached to the storage battery by which the storage battery is able to be detachably secured to the footing part with quick locking.

The most significant advantage of the invention relative to the designs of the prior art is that the mounting of a storage battery in its place and detaching it therefrom thus becomes extremely simple. As a results, the possibilities to use the storage battery are significantly wider than with designs known in the art because the storage battery is easy to detach e.g. for other uses.

A remarkable advantage from the manufacturing technological point of view is that, independent of its intended use, the storage battery can be manufactured in the same way, whereby longer uninterrupted than before can be achieved in storage battery manufacture. Therefore, requirements set by the application, for instance requirements being dependent on the make of the car, need no longer be considered in manufacturing storage batteries. Conforming to the application, and in particular to the fastening base, only the modifications required in the detached footing of the storage battery have to be carried out.

The other advantages and characteristic features of the invention are presented in the following detailed description of the invention, to which, however, the invention is not intended to be exclusively confined.

BRIEF DESCRIPTION OF THE DRAWING

The invention is described in the following in detail referring to the figures of the accompanying drawings wherein.

DETAILED DESCRIPTION

Figure 1:
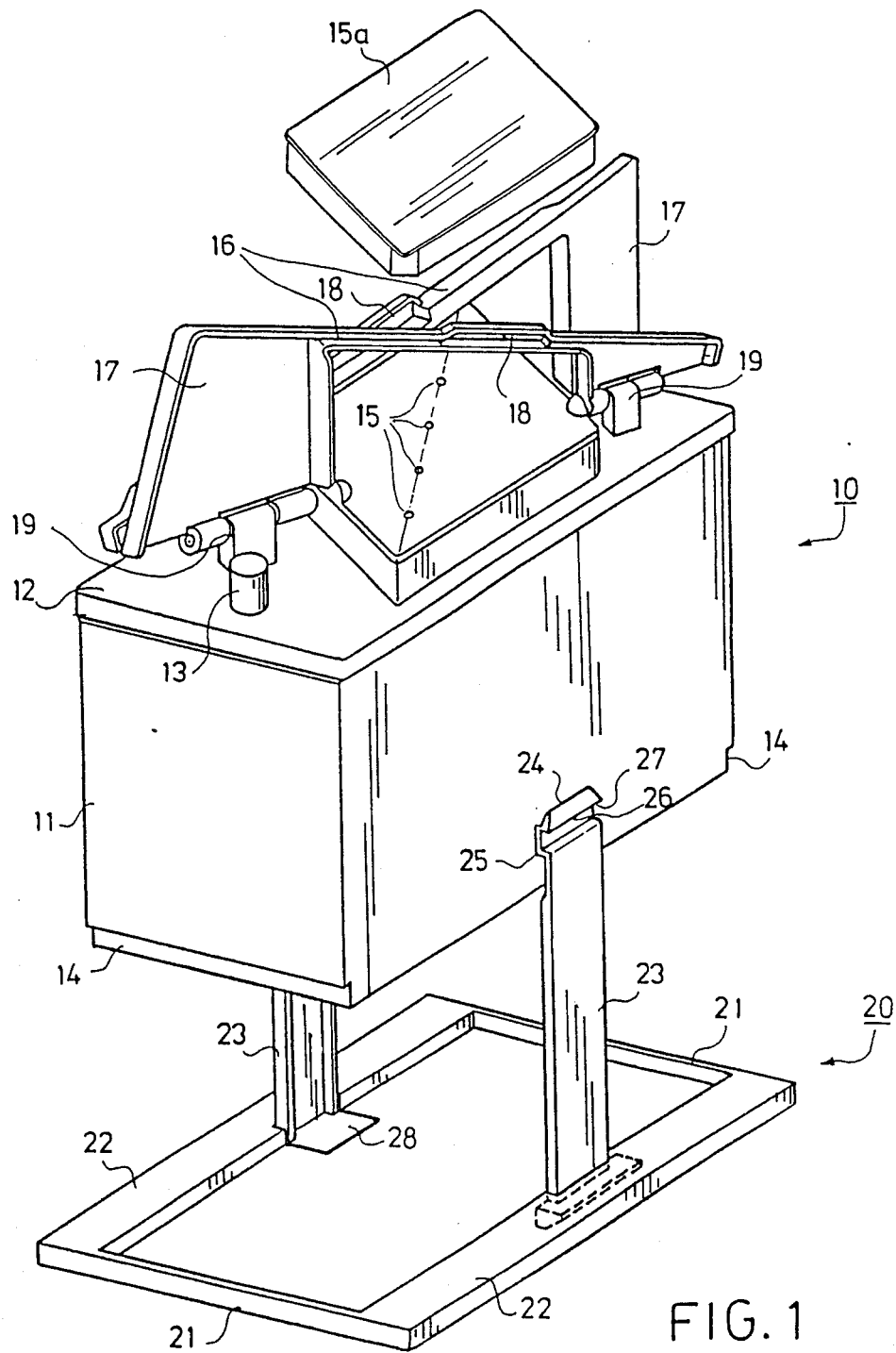
FIG. 1 presents the mounting fixtures for the storage battery in perspective view with the mounting fixtures being opened.

In the figures of the drawing, the storage battery is in general indicated by reference numeral 10. the storage battery 10 comprises a housing 11 surrounding the bottom and sides of the storage battery, the housing being closed with a cover 12 in the top part. The cover 12 of the storage battery is provided, as usual, with terminals 13 and acid-filling apertures 15 for the cells of the storage battery. The storage battery 10 moreover comprises a shield 15a (for, clarity, shown removed from the battery) for acid-filling apertures with which the acid-filling apertures 15 can be covered. On the cover 12 of the storage battery, carrier handles 16 are pivotally attached by means of hinges 19, by which the storage battery can easily be lifted and carried.

In the embodiment of FIG. 1 the carrier handles are turned upwards into the carrying position. The carrying handles 16 act as one locking part of the mounting device of the invention and therefore, locking gaps 18 are provided in the carrier handles, the significance of which are described in greater detail below. In addition, plate-like parts are provided in the carrying handles 16, acting as the shields 17 of the storage battery terminals 13 when the carrying handles 16 are turned against the cover 12 of the storage battery in the locking position.

For mounting the storage battery 10 on a mounting base in its application use, the storage battery is provided with a footing separate from the storage battery 10, which in the figures of the drawing is in general indicated by reference numeral 20. The footing 20 comprises transversal members 21 and longitudinal members 22, defining an aperture therebetween into which the bottom of the storage battery 10 is intended to be fitted.

In the embodiment of the fiqures, steps 14 are provided in the lower part of the storage battery 10, in the corners between the battery bottom and the shorter end sides, to make certain that in the storage battery 10, when mounted on the footing 20, the steps 14 provide that the battery 10 is directed into an appropriate position in the footing 20. When the storage battery 10 is mounted on the footing 20, the tranversal members 21 of the footing are located in the steps 14 located in the lower part of the storage battery. On the longitudinal members 22 of the footing 20 there are fixed upstanding yokes 23 directed upwards from the footing 20, between which the storage battery 20 is intended to be mounted, as shown in in the figures, The length of the upstanding yokes 23 is slightly greater than the height of the storage battery 10 in that a tip 24 of the fixing yokes 23 is located above the storage battery cover 12 when the storage battery 10 is mounted on the footing 20. The yokes 23 are provided with first lugs 25 facing the storage battery which, when storage battery 10 is mounted on the footing 20, respond to the cover 12 of the storage battery. In addition, transversal groove 26 is provided in each yoke 23 below the tip 24, the upper part of the groove 26 being defined by another lug 27 directed away from the storage battery 10.

Figure 2:
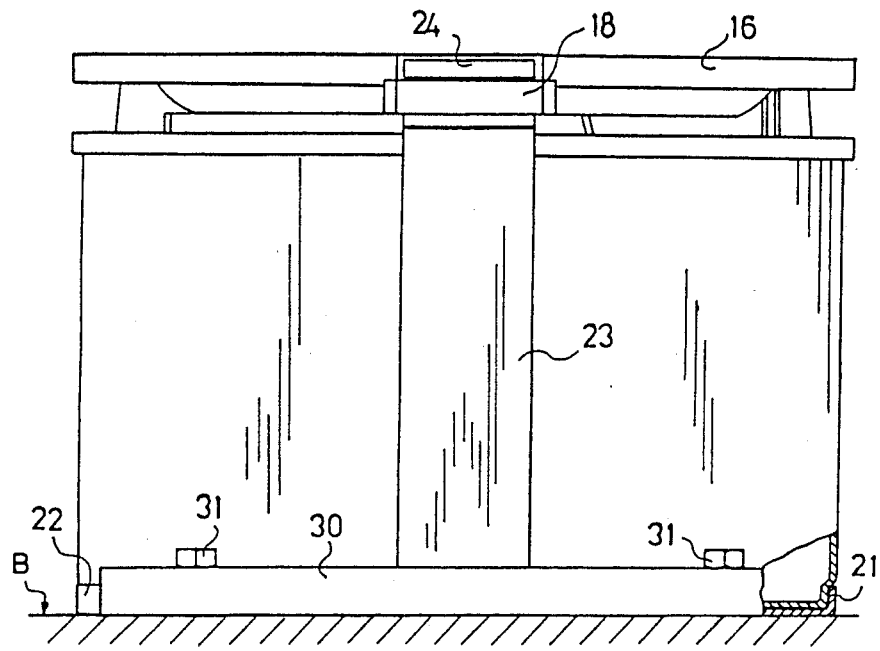
FIG. 2 is a side-elevation view of the mounting fixture and the storage battery with the mounting fixture locked.
Figure 3:
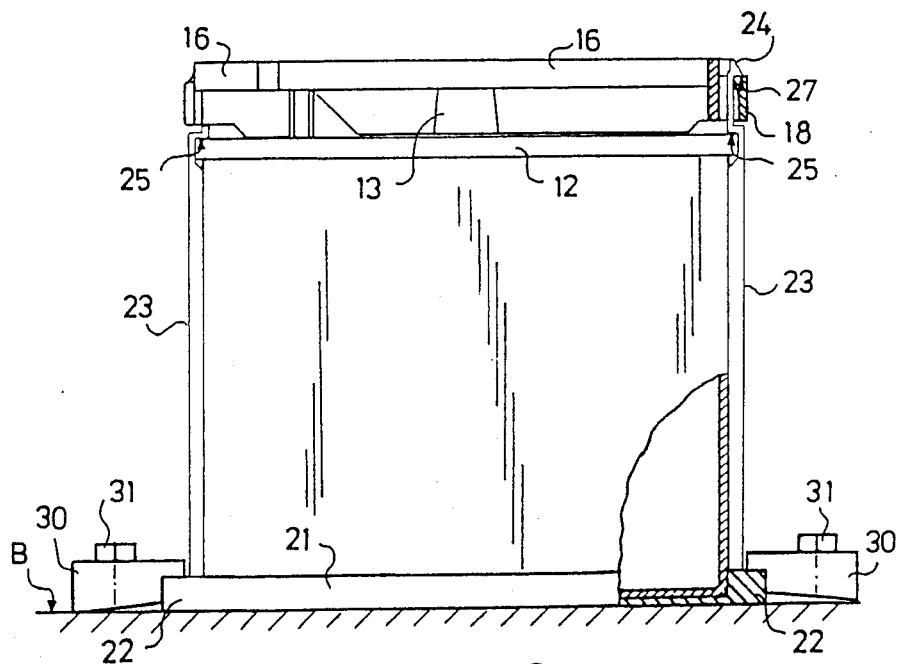
FIG. 3 corresponds to FIG. 2 viewed at the end of the mounting fixture and the battery, partly sectioned.

The storage battery 10 is so secured to the footing 20 between the yokes 23 that the carrying handles 16 are turned from the position shown in FIG. 1 downwards to a position shown in FIGS. 2 and 3 in that the tips 24 of the yokes 23 enter the locking gaps 18 located in the carrying handles 16 to allow the handles 16 to fit in the grooves 26 of the yokes. The first lugs 25 in the yokes 23 therefore prevent the storage battery 10 from coming up from the footing 20 and on the other hand, the locking gaps 18 in the carrying handles 16 ensure that the yokes 23 do not turn aside but remain in their locations. The first lugs 25 in the yokes 23 therefore receive the main stresses of the battery fixing, and the carrying handles 16 and especially the locking gaps 18 therein merely make certain that the fixing yokes remain in the right position.

It is furthermore shown in FIG. 1 that horizontal supports 28 extend from base positions of the yokes 23 to be located under the bottom of the storage battery 10 when the battery is in place on the footing 20. This is merely an additional safety measure because the steps 14, in the corners between the transverse battery walls and the bottom, ensure a maintaining of the storage battery 10 in the proper position on the footing 20. The footing 20 is fixed to the base B (FIG. 3) in a manner equivalent to that of the conventional storage batteries which are provided with fixed footing. Therefore, securing tangs shown e.g. (FIGS. 2 and 3, can be used for the securing of footing 20, the tangs 30 being tightened with screws 31 against the footing 20. The tangs 30 press the footing 20 tightly against the base B, whereby the footing 20 is rigidly fixed on said base B. The storage battery 10 may, however, be easily detached from the footing 20 by turning the carrying handles 16 upwards into the position shown in FIG. 1, whereby the storage battery 10 can be lifted from the footing 20, e.g. by lifting at the carrying handles 16.

The invention is described above referring to the figures of the drawing attached. It is not intended, however, to confine the invention exclusively to the example presented in the figures, and modifications are feasible within the scope of the inventive idea set forth by the claims which follow.

We claim:

1. A mounting device in combination with a storage battery for securement to a base, the device comprising:
    a footing adapted to be rigidly fastened to the base, the footing being separate from the storage battery to permit engagement and disengagement of the footing from the storage battery; and
    a set of locking elements pivotally attached to the storage battery and configured for engagement detachably with said footing to accomplish a rapid locking of the storage battery to the footing wherein
    said footing comprises a base portion and elongated yokes upstanding from the base portion, the yokes being spaced apart for receiving the storage battery therebetween upon the mounting of the battery on the footing;
    said locking elements are engagable with said yokes for locking the battery to the footing; and
    further comprising a cover for said battery, and wherein said yokes comprise fastening lugs located on the yokes in registration with said cover of said battery upon a mounting of a battery in the footing; and
    locking grooves are provided in said yokes for receiving locking elements of said set of locking elements.

2. A mounting device according to claim 1 wherein said set of locking elements comprises:
    carrying arms pivotally connected to the storage battery, each of the carrying arms having a gap positioned for engagement in one of said locking grooves of said yokes; and
    wherein a securing of said gaps in said yoke grooves maintains registration of said yoke lugs against said battery cover.

3. A mounting device according to claim 1, wherein said set of locking elements is pivotally mounted to the cover of the battery.

4. A mounting device according to claim 1, wherein said set of locking elements include carrying handles by which the storage battery can be lifted from said footing upon disengagement of said locking elements from said footing;
    disengagement of said locking elements from said footing is obtained by rotating individual ones of said locking elements to an open position; and wherein
    a plurality of said locking elements include shields for said terminals of the battery, said battery having terminals and a shielding of the battery terminals also being accomplished by rotating said plurality of locking elements to a locking position for securing the battery to said footing.

* * * * *